United States Patent [19]

Lehner

[11] Patent Number: 4,898,256

[45] Date of Patent: Feb. 6, 1990

[54] STAIR-CLIMBING WHEELCHAIR CARRIER WITH CRAWLERS

[75] Inventor: Max Lehner, Prambachkirchen, Austria

[73] Assignee: Sunwa Sharyo Manufacturing Co., Ltd., Tokyo, Japan

[21] Appl. No.: 259,651

[22] Filed: Oct. 19, 1988

[30] Foreign Application Priority Data

Oct. 20, 1987 [AT] Austria .................... 2764/87

[51] Int. Cl.$^4$ .................... B62B 5/02; B62D 55/04
[52] U.S. Cl. .................... 180/8.2; 180/907; 280/5.22; 280/9; 280/DIG. 10
[58] Field of Search .................... 180/8.2, 9.1, 9.22, 180/9.07; 280/5.22, DIG. 10; 414/678, 679, 921

[56] References Cited

U.S. PATENT DOCUMENTS 4,771,839  9/1988  Misawa .................... 180/8.2

FOREIGN PATENT DOCUMENTS

3225679  2/1984  Fed. Rep. of Germany .
2216014  11/1984  Fed. Rep. of Germany .
3416222  5/1987  Fed. Rep. of Germany .

Primary Examiner—Mitchell J. Hill
Attorney, Agent, or Firm—Armstrong, Nikaido, Marmelstein, Kubovcik & Murray

[57] ABSTRACT

A crawler unit for coupling to a wheelchair, especially for climbing stairs, comprises an undercarriage having power-driven tracks and an adapter for securing the wheelchair in a rearwardly tilted travelling position. In order to enable the wheelchair user to couple and decouple and maneuver the wheelchair by himself, the adapter which includes a male coupling member for mating engagement with a complementary female coupling member mounted on the wheelchair is connected to the crawler unit through lifting means adapted to be operated by the wheelchair user via actuating or control elements for selectively lifting the wheelchair relative to the crawler unit and lifting the crawler unit while the wheels of the wheelchair remain on the ground, such operation being possible both in position of the wheelchair.

23 Claims, 8 Drawing Sheets

STAIR-CLIMBING WHEELCHAIR CARRIER WITH CRAWLERS

BACKGROUND OF THE INVENTION

The present invention relates to a crawler unit for coupling to a wheelchair, and especially to a unit for climbing stairs and travelling up access ramps, wherein a crawler unit undercarriage which comprises the power-driven tracks and fits between the main wheels of the wheelchair includes an adapter for securing the wheelchair in a rearwardly tilted travelling position, in which the wheels of the wheelchair are lifted off the ground.

Such a combination of wheelchair and crawler unit offers the advantage that the coupling between the two elements is only effected as required and the user of the wheelchair is able to use the wheelchair by him. The wheelchair user need not leave the wheelchair when the crawler unit is coupled or decoupled, respectively. Advantageously, crawler units with tracks having a strong tread pattern and made from rubber or rubber-like plastic material are employed, wherein two tracks are provided which are adapted to be separately driven via electric motors and transmissions, the travelling speed and direction being adjustable separately and jointly. One or several chargeable storage batteries are employed as power supply means. The use of corresponding crawler units offers greater mobility to the wheelchair user than the use of an elevator or escalator which is always stationary, i.e. which requires stairs or buildings; moreover, any later provision of such an elevator or escalator in existing buildings always poses problems. Since in most cases only short distances are being travelled by means of the crawler unit, it may be of light structure, and the travelling speed which can be achieved is not critical. Also, the crawler unit can be taken along in a motor vehicle.

In a known crawler unit of the specified kind, the entire adapter is mounted on the undercarriage for pivoting movement about a transverse axis and can be fixed in various positions of rotation. The back rest of the wheelchair is driven towards the adapter, which is located approximately vertically, and is connected to the adapter via clamps or the like. Due to a corresponding arrangement of the tilting axis, it is possible by tilting the adapter with the wheelchair secured thereto that the wheels of the wheelchair in the tilted state are lifted off the ground, so that the wheelchair is only supported by the crawler unit via the adapter. Preferably, the adapter is extended beyond the back rest approximately to head level of the wheelchair user and is provided with handles by means of which it can be swivelled, there being also provided in the vicinity of these handles control elements for activating and deactivating the drive motors and for controlling the drive speed. Tilting of the wheelchair is necessary so that the seat of the wheelchair will not tilt forwards during climbing of stairs or any other major inclination. Irrespective of whether the assembly travels upstairs or downstairs, the wheelchair user always looks down the stairs. The known crawler unit can only be coupled to the wheelchair by a helper, and it is basically intended that such a helper actuates and controls the unit. Thus, the wheelchair user basically depends on others as regards the use of the crawler unit. The helper is also confronted with problems concerning steering of the crawler unit, because the same rests on the ground during the steering process and to steer the helper has to stand behind the titled wheelchair so as to be able to manipulate the controls. For negotiating narrow staircases or staircases with small landings the use of the known crawler units is frequently impossible for the specified reasons.

SUMMARY OF THE INVENTION

The object of the present invention is to provide a crawler unit which can be coupled and decoupled and controlled by the wheelchair user himself without requiring him to leave the wheelchair, so that the wheelchair user will no longer depend on outside help. It is a partial object of the present invention to provide a structure which has substantially improved maneuverability as compared with the known structure.

A crawler unit in accordance with the present invention is characterized in that the adapter, which includes a male coupling member for mating with a complementary female coupling member mounted on the wheelchair, is connected to the crawler unit through lifting means which can be selectively actuated by the wheelchair user through actuating or control elements so as to lift the crawler unit while the wheels of the wheelchair remain on the ground, this being preferably possible both in the normal driving position and when the wheelchair is tilted.

A conventional wheelchair has a substantially better maneuverability than a crawler unit unless one accepts highly complicated driving and control means for the crawler unit whereby the overall weight and the price are decisively increased. Due to the structure according to the invention, the wheelchair user is now enabled selectively to lift the crawler unit and to perform by himself narrower turns or changes of direction through narrow curves or around corners by controlled manipulation of the wheelchair. Even when only short distances are to be travelled between two applications of the crawler unit, the arrangement according to the present invention is still advantageous because the wheelchair user is able to travel such short distances selectively either with the crawler unit or by actuation of the wheels of the wheelchair while the elevated crawler unit remains on the wheelchair. The increased maneuverability in conjunction with an easily operable or automatically engaging male coupling member permit operation of the crawler unit by the wheelchair user himself or herself, who is no longer dependent on outside help.

Pneumatic, hydraulic or electric accessory drive means can be provided for the following functions: tilting the wheelchair in either direction, actuating the coupling for engagement and disengagement thereof, elevating the crawler unit, the elevating the wheelchair; when an electrically powered crawler unit is used, accessory drive means equipped with electric motors for performing the required adjustments for instance via worm drives can be provided, and control elements such as push-button switches are provided within the wheelchair user's reach for controlling the selected function. Corresponding embodiments are naturally expensive and will appropriately only be provided if the wheelchair user is disabled to such an extent that manual operation cannot be expected. To provide a construction that is as simple and inexpensive as possible one will endeavour to have the wheelchair user perform all or most of the mentioned functions by application of his muscular strength. By suitable transmissions in respective adjusting or driving train it is possible to make matters easier. Therefore a preferred embodiment features, among other things, actuating levers for the elevating means of the crawler unit, such levers being provided within reach of the wheelchair user. The elevating means can be a lever gear which may be fixed or secured via a locking mechanism in either elevated position (extended and elevated crawler unit). Advantageously, the locking mechanism is designed as an over-centre locking mechanism having two over-centre positions.

Tilting of the wheelchair also may be performed by muscular strength by a wheelchair user provided he has average strength and is not unduly handicapped in the use of hands and arms. In this connection it is possible to provide on the adapter at least one holding bar which projects sideways approximately horizontally beyond the seat of the wheelchair when in the normal travelling position, the wheelchair user holding himself by this bar for tilting or returning his wheelchair from the tilted position. It is possible to provide a structure in which the adapter—in contrast to the known design which is pivotable in its entirety—has a stationary, inclined supporting frame for supporting the wheelchair in the tilted position, on which supporting frame automatically latching safety clamps for the wheelchair backrest or counter-clamps thereon are provided so that the wheelchair is secured at the end of the tilting process in this tilted position. It is also possible to provide incremental presetting of the inclination of the supporting frame for adaptation to different gradients of staircases or terrain.

A particularly simple and operationally safe configuration for the unit which provides the connection between wheelchair and crawler unit resides in the feature that the male coupling member comprises at least a spigot, which is mounted on the adapter and preferably tapers at its free end, onto which spigot in its approximately horizontal coupling position facing in homing direction of the wheelchair a receptacle constituting the female coupling member and being mounted on the wheelchair beneath the seal can be pushed up to an abutment; the spigot is supported for pivoting movement about a transverse axis which defines the tilting axis of the wheelchair and is preferably arranged at a major distance beneath the wheel axis of the wheelchair and offset rearwardly relative to said wheel axis, and the adapter has provided thereon a guideway extending in a circular arc about the mentioned pivot axis for an abutment, which is provided on the wheelchair and is preferably constituted by a roller or a ball bearing and in the coupling position of spigot and receptacle and during the tilting movement is in engagement with said guideway to secure spigot and receptacle in the engaged position and thus to secure the wheelchair to the adapter. This abutment is brought in permanent engagement with the guideway both during tilting of the wheelchair and during elevation of the crawler unit relative to the wheelchair, so that an operationally safe coupling between wheelchair and crawler unit is provided disengageable by wheeling the wheelchair off the crawler unit.

To ensure the maneuverability of the assembly formed by wheelchair and crawler unit, the overall length of the crawler unit should be selected to be substantially no more than the usual length of a wheelchair having a footrest, wherein the upper end of the tilted back rest is placed approximately above the associated end of the crawler unit. At this end of the crawler unit the tracks will be guided to extend obliquely outwardly/upwardly so that they may safely contact the edges of treads. In accordance with a further improvement of the invention it is intended that at least one supporting roller, which can be placed on the ground via an actuator, is mounted on the crawler unit or adapter in front of the crawler unit end beneath the back rest of the tilted wheelchair or, respectively, beneath the end of the obliquely rising tracks. This supporting roller may have a plurality of functions. First of all, it ensures that the crawler unit/wheelchair assembly does not over-balance to the rear when the wheelchair is rapidly moved to the tilted position. But with the wheelchair tilted and the crawler unit elevated the supporting roller has a very important function. In this position the wheelchair would be unstable if it were supported solely by its main wheels. Apart from this fact the supporting roller makes it possible in the last-mentioned case to turn the wheelchair about practically where it stands with the crawler unit in the elevated position by forward-rotation of the one and backward-rotation of the other main wheel, while complex crawler controls for this turning operation are not required. The wheelchair/crawler unit assembly is capable of even better maneuvering than a plain wheelchair when the wheelchair is tilted, the crawler unit is elevated and the roller is extended. This permits the user to accurately maneuver the assembly and to travel even along narrow staircases with small landings. Maneuverability is facilitated by the fact that the supporting roller like a rowel or furniture wheel is mounted for pivoting motion about a stationary axis or is designed as a ball caster.

To facilitate operation and to increase the safety feature, it may be provided that in certain operating conditions the supporting roller is controlledly extended while in other operating conditions it is controlledly retracted. To this end the actuator for the supporting roller is drivingly connected to the coupling spigot or to a wheelchair position detector of its own which is responsive to the tilting and lifting or lowering of the crawler unit, so that it extends the supporting roller upon tilting of the wheelchair and/or lifting of the crawler unit with the wheelchair tilted, and lifts the roller off the ground when the wheelchair is in its normal travelling position or when the crawler is lowered while the wheelchair is tilted.

With the known crawler units the helper who operates the unit during stair-climbing is able to urge the adapter upwards especially during downstairs travel upon a transfer from flat ground onto the staircase, whereby the crawler unit is inclined in the direction of the staircase, before the overall centre of gravity of wheelchair user, wheelchair and crawler unit has been moved across the uppermost tread edge. Any positional changes of the total system which occur when the overall centre of gravity crosses the mentioned edge will be compliantly absorbed by the helper due to the exertion of power on the helper's side. Since thanks to the inventive configuration the wheelchair user is now able to drive by himself, it is desirable that the mentioned tilting operations upon transfer of the overall centre of gravity across the edges that lead from flat ground to the inclined path should be avoided or alleviated. Therefore, in accordance with a modification of the invention the crawler unit comprises concavely curved guideways for the crawler sections which contact the ground, these crawler sections being either guided to continually follow the guideways or being stretched across the concavity by means of stretching means of their own, so that they will engage the arcuate guideways only in case of point loads. In either case the effect will be that upon movement across the mentioned edge, which leads from flat ground to the inclination, the crawler will yield, i.e. the crawler unit already starts to adjust to the stair gradient before the overall centre of gravity has been moved across the edge.

The same effect may be achieved when, in accordance with another embodiment, the crawler unit is divided lengthwise into two or more separately driven crawler groups which are interconnected to pivot about a transverse axis, wherein at least the crawler group which respectively faces downstairs may be swivelled downwardly so that it will adjust to the stair gradient beforehand.

Further details and advantages of the invention will be apparent from the following description of the drawings.

DETAILED DESCRIPTION OF THE PREFERRED EMBODIMENT

Figure 1:
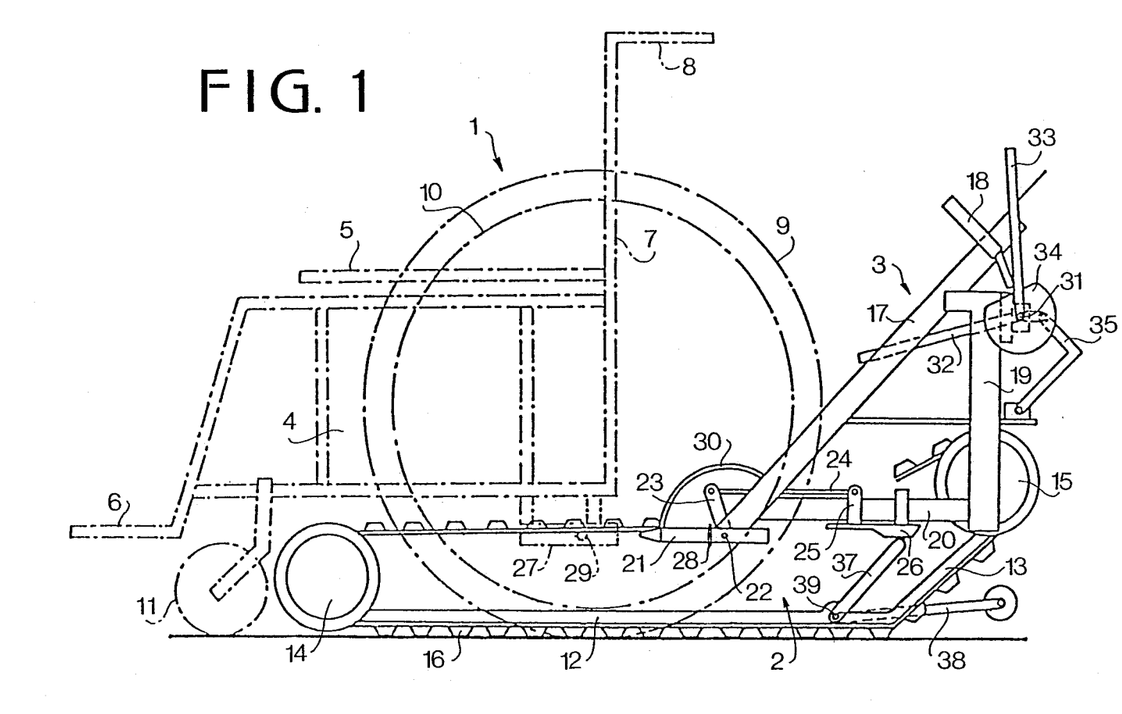
FIG. 1 is a schematic side view of a wheelchair/crawler unit assembly according to the present invention, in which a wheelchair is indicated in dash-dot lines and a crawler unit is indicated in full lines.
Figure 2:
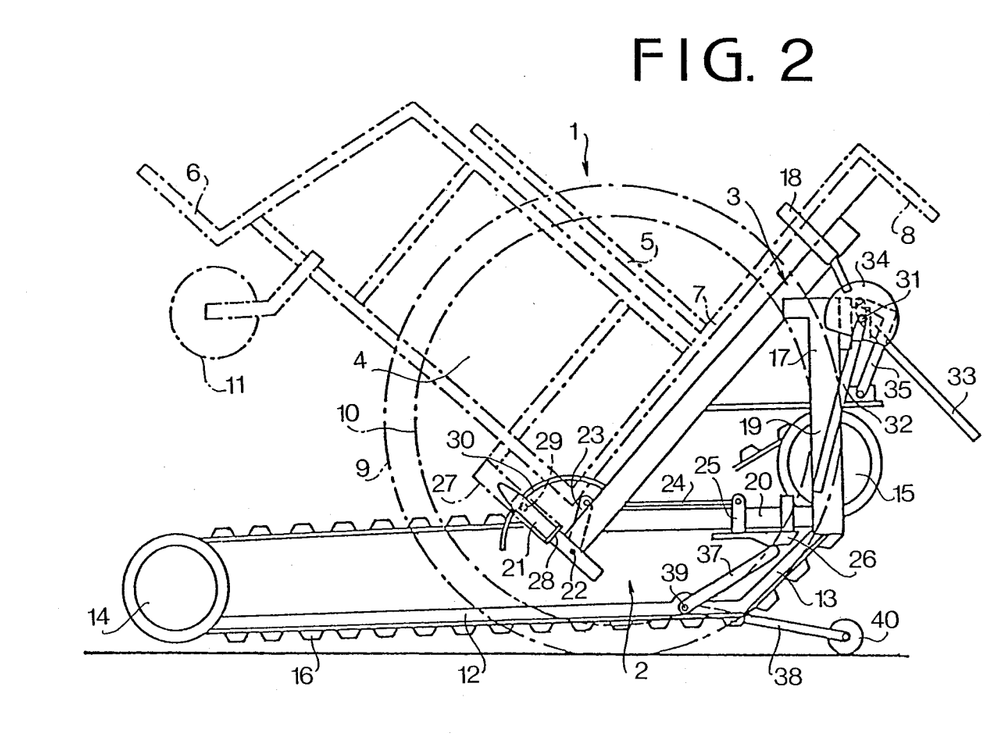
FIG. 2 is a side view showing the unit assembly after the coupling operation, with the wheelchair tilted, the crawler unit elevated and the supporting roller extended.
Figure 3:
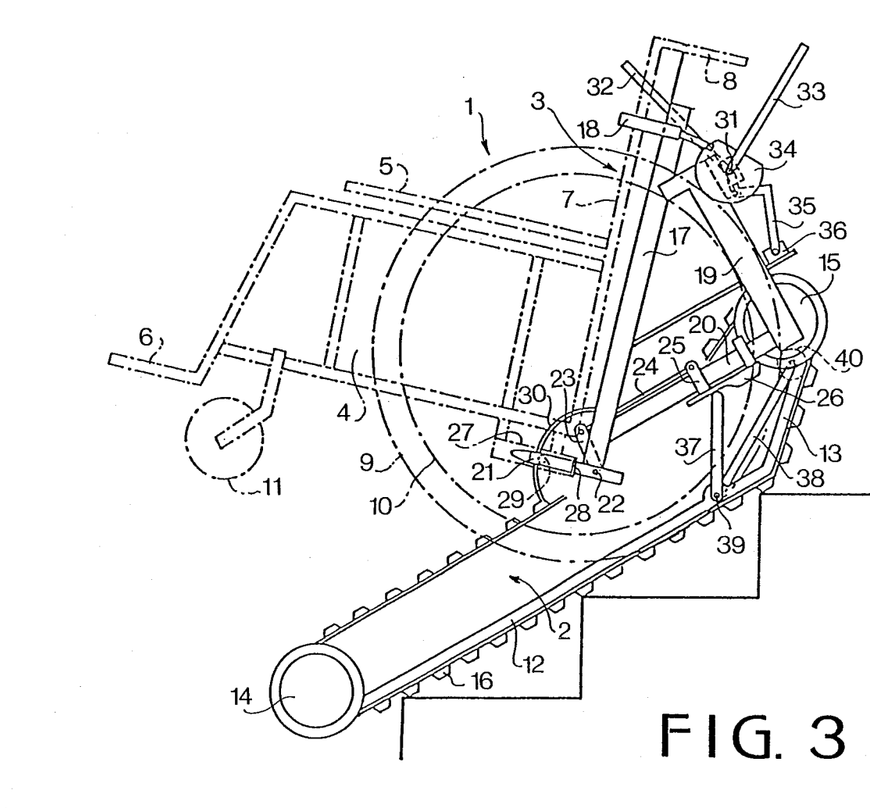
FIG. 3 is a side view showing the assembly during climbing of a staircase.

Referring to FIGS. 1 to 3, the assembly composed of wheelchair/crawler unit comprises a wheelchair 1, a crawler unit 2 and an adapter 3 for securing and adjusting the wheelchair 1 relative to the crawler unit 2.

In the illustrated embodiment, a conventional collapsible wheelchair 1 is illustrated in outline. The wheelchair 1 includes a seat portion 4, lateral arm rests 5, a foot rest 6, a back rest 7 with a push handle 8, main wheels 9 with operating rings 10 and supporting wheels 11.

Figure 4:
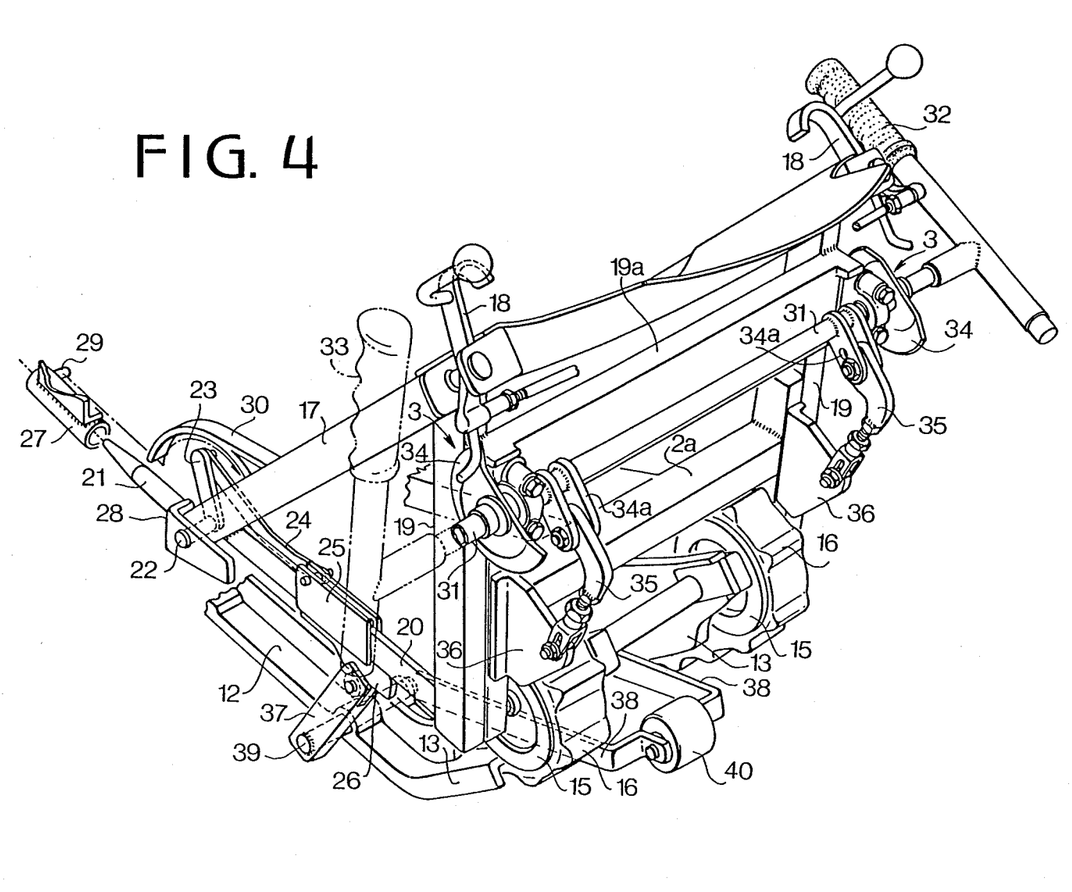
FIG. 4 is a perspective view showing a main part of the unit.

The crawler unit 2 comprises a frame 2a (FIG. 4), lower guide rails 12, 13 which are bent upwards at the righthand end, and tracks 16 made from rubber or a rubber-like material. The tracks 16 are trained about drive wheels 14 and idler wheels 15. Electric motors with output-side transmissions are provided for the drive wheels and powered by a storage battery disposed within the crawler unit 2. Control means for actuating and deenergizing the crawler unit, for varying the speed and for reversing the direction of travel are mounted at a location which can be reached by the wheelchair user; for the sake of clarity these means have not been illustrated.

The adapter 3 comprises a fixed supporting frame 17 for the back rest 7 of the tilted wheelchair (FIGS. 2 and 3), and retaining clasps 18 provided on the supporting frame itself for locking engagement with the side props of the back rest 7. The retaining clasps 18 are releasable by manual operation. The supporting frame 17 is rigidly joined to an upright frame member 19 and a horizontal guide bar 20, which is also secured to the frame member 19. At the lower end of the supporting frame 17, a spigot 21, which constitutes a male coupling member, is mounted for pivoting movement about a transverse axis 22. The axis 22 defines a tilting axis for the wheelchair and has a lever 23 secured thereon. The lever 23 is pivotable together with the spigot 21 and is connected via a connecting rod 24 to a slide 25 mounted on the guide bar 20. The slide 25 moves a driving wedge 26 in response to the relative pivoted position of the spigot 21 with respect to the frame 17.

Beneath the seat of the wheelchair 1, a receptacle 27 is mounted which constitutes a female coupling member for the spigot 21. When the wheelchair is driven from the position shown in FIG. 1 towards the right, the receptacle 27 with the help of the tapering end of the spigot 21 is moved onto the spigot 21 until it engages an abutment 28, whereby a plug-in connection between wheelchair 1 and adapter 3 is established. With the receptacle 27 being mated and thus in the coupled position, a stop roller 29 designed as a ball bearing comes into contact with a guideway 30 beneath which it has passed during the mating operation by utilizing the compliance of the wheels of the wheelchair, if necessary by means of a lead-in aid. The guideway 30 is offset relative to the spigot 21 in the direction of the axis 22 and is arranged about the axis 22 like a circular arc. By means of engagement of the stop roller 29 with the guideway 30 during tilting, the coupling members 21, 27 are retained in permanent engagement.

The frame member 19 has an operating shaft 31 mounted on an upper portion thereof which may be rotated by means of hand levers 32, 33. The levers 32, 33 extend on the left-hand and right-hand side and are respectively easily reached by the wheelchair user. A pair of crank members 34, each having a flat portion on one side, are secured to the operating shaft 31 and in pivoting engagement with angle levers 35 through links 34a. The angle levers 35 are engaged with brackets 36 which are secured to the frame 2a of crawler unit 2 in the vicinity of the wheel 15.

By rotating the shaft 31 through the hand levers 32 or 33, the crawler unit 2 is elevated or lowered by means of the angle levers 35. Possible positions are the over-centre positions of the fulcrum of the angle lever 35 on the crank member 34 as illustrated in FIGS. 2 and 3. In the position of FIG. 2, the crawler unit 2 is elevated relative to the tilted wheelchair 1. During this elevating operation, the driving wedge 26 exerts pressure on a lever 37 to which a further operating lever 38 is pivotally connected by way of a pivot 39 provided on the lower guide rail 12, so that a running roller 40 is supported on the ground. The roller is only lifted in the position shown in FIG. 1 and is swung inwards in the position shown in FIG. 3.

In the position illustrated in FIG. 2, the wheelchair/crawler unit assembly is supported on the ground only by the main wheels 9 and the running roller 40, so that the wheelchair 1 with the elevated crawler unit 2 may be turned practically where it stands by operation of the wheels 9. To facilitate this process, the roller 40 may be mounted like a furniture roller for rotation about a vertical axis.

During the coupling process, the wheelchair user will drive with the wheelchair, as already described, from the lefthand end in FIG. 1 over the crawler unit 2 until the coupling members 21, 27 are fully mated, the assembly being secured by engagement of the stop roller 29 in the guideway 30. A lever which may be detachable and which extends side ways beyond the seat area of the homing wheelchair can be mounted on the frame member 19 or the supporting frame 17, so that the wheelchair user may grip this lever and may pull himself hand over hand towards the adapter 3 while the wheelchair is being tilted about the axis 22, until the back rest 7 rests on the frame 17 and the clasps 18 are lockingly engaged.

Both in this tilted position and also in the position made secure by engagement of the stop roller 29 in the guideway 30, the crawler unit can be selectively elevated by actuation of the levers 32 or 33, respectively. In the operative position illustrated in FIG. 3, the wheelchair is lifted via the crawler unit 2 and may now be moved by energizing and deenergizing the crawler drive means of the assembly. As described in conjunction with FIG. 2, turning maneuvers are possible with the wheelchair 1 tiled, the crawler unit 2 lifted and the roller 40 extended. A switching mechanism (not illustrated) for the crawler drive may be equipped with stop means for inhibiting energization of the drive while the crawler unit is elevated, so that accidents will be prevented.

The links 34a of the crank member 34 about a lateral with bar 19a secured to the frame 19 in the one overcentre positions shown in FIGS. 2 and 3, whereby additionally securing the unit 2 and adapter 3.

The adapter 3 may be provided with sensing mechanisms for matching with different heights and widths of the used wheelchairs 1. Among other things, it is possible to mount the frame member 19 so as to be height-adjustable with respect to the base plate 36, so that the respective set position can be locked by snap-action. Among other things, this height adjusting feature provides for alignment of the coupling spigot 21 with the level of the receptacle 27.

As set out above, measures should also be taken for decelerating or damping the tilting movement of the crawler unit including the wheelchair and the user when travelling across an edge leading from level ground to a slope, so that undesirably large tilting moments can be prevented. To this end it has been proposed above to provide the crawler unit with concavely curved guide rails for the ground-engaging tracks strands, these track stands being either guided to permanently follow the rails or being tensioned across the curve with the aid of tensioning means of their own, so that they will engage the curved guide rails only upon application of a lumped load.

Figure 5:
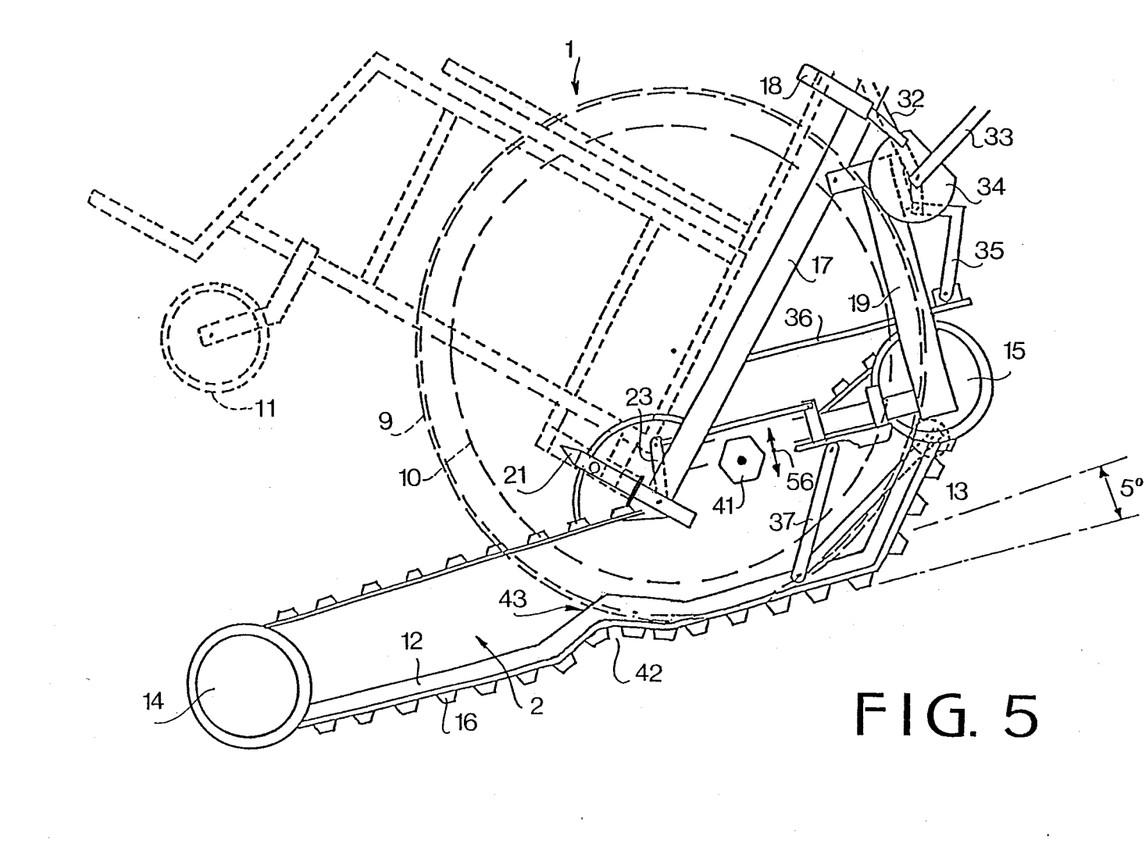
FIG. 5 is a side view of a first modification of the wheelchair/crawler unit assembly, in which the ground-side guide rail for the tracks is modified in respect of the first embodiment illustrated in FIGS. 1 to 4.

The same effect can be achieved by the embodiment illustrated in FIG. 5, which is characterized by the feature that the guide rails 12 for the ground-engaging track strands are respectively bowed or bent inwardly, i.e. in the direction towards the upper strand of the tracks 16, in the vicinity of the overall centre of gravity of crawler unit 2, adapter 3, wheelchair 1 and wheelchair user (not illustrated). The corresponding bend in the ground-side guide rails 12 is indicated by 43 in FIG. 5. Due to this measure the tilting operation upon a transition of the crawler unit 2 across an edge 42 leading from level ground to a slope may be stabilized, because the tilting angle is reduced in this embodiment by a few degrees, e.g. by 4° to 7°, especially by about 5° as in the illustrated embodiment. This reduction of the tilting angle is obtained because the edge 42 is shifted in the vicinity of the bent rail portion 43 towards the overall centre of gravity, such shifting being initiated before the overall centre of gravity has been moved across the edge 42.

In order to enable the track strands to follow the bent rail section 43 upon crossing of the edge 42, it is advantageous to urge the supporting rollers 41, which ensure horizontal guiding of the upper track strands, under resilient bias against the tracks 16 or their upper strands, respectively. This resilient bias is indicated by the double arrow 56 in FIG. 5.

For the rest, the wheelchair/crawler unit assembly shown in FIG. 5 corresponds to that illustrated in FIGS. 1 to 3, so that reference shall be made to the corresponding description of FIG. 1 to 3 in respect of the remaining parts.

Figure 6:
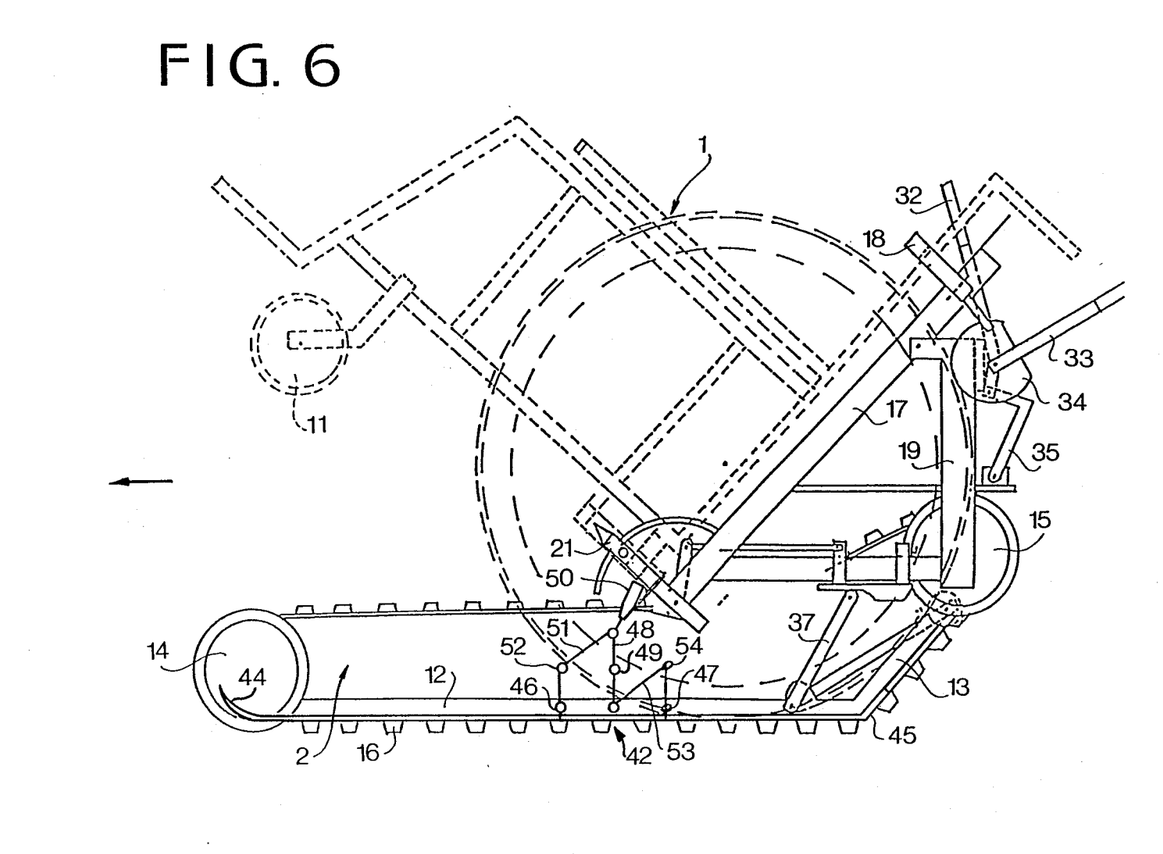
FIGS. 6 to 8 show a side view of a further modification of the wheelchair/crawler unit assembly, in which means are schematically shown for damping the tilting movement of the crawler unit when travelling across an edge leading from a level section to a slope, and vice verse.
Figure 7:
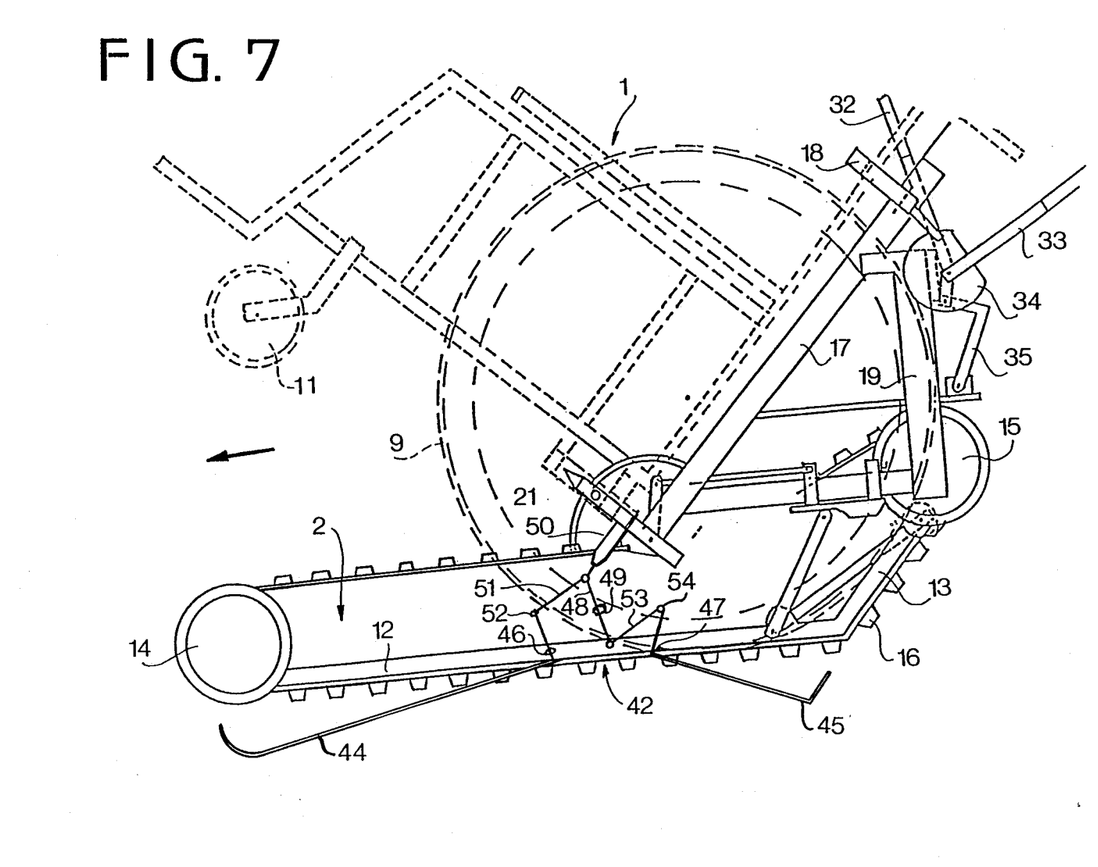
Figure 8:
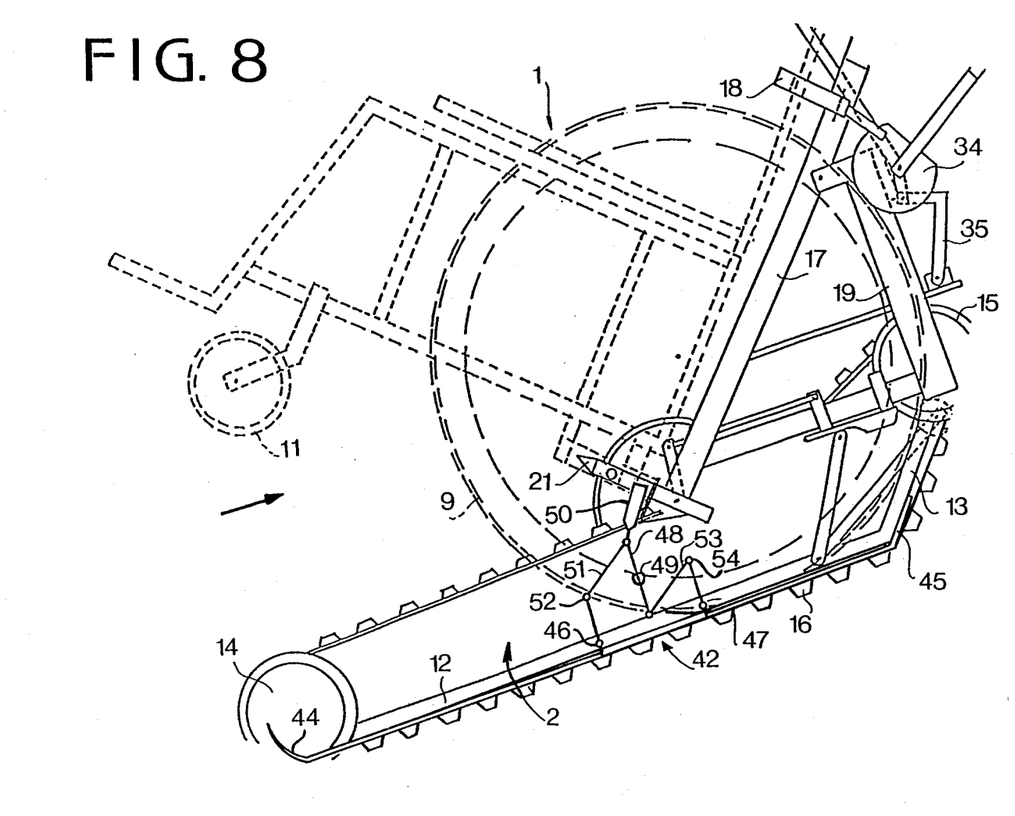

With reference to FIGS. 6 to 8, a further modification of the wheelchair/crawler unit assembly shall be explained, which is distinguished by the feature that means for decelerated tilting of the crawler unit 2 upon crossing an edge 42 leading from level ground to a slope is provided both in the front and the rear area of the crawler unit 2. Said means for decelerated tilting of the crawler unit 2 upon crossing from level ground to a slope comprises a supporting rail 44 mounted on the crawler unit 2 for pivoting movement about a horizontal transverse axis 46 in front of the overall centre of gravity of crawler unit 2, adapter 3, wheelchair 1 and wheelchair user such that upon crossing of the edge 42 leading from level ground to a slope said supporting rail with its front end may be swung downwards beyond the plane defined by the lower track strands while the front end of the supporting rail engages the slope or the lower edges of steps, respectively. This position is indicated in FIG. 7. Preferably, two mutually parallel supporting rails 44 are provided which are disposed in spaced relationship intermediate the two tracks 16. The pivot 46 either extends in the vicinity of the ground-side guide rails 12 or, in the illustrated embodiment, is secured thereto. The forward free end of the supporting rails 44 is curved upwards like the blade tip of a cross-country or running ski. The means for decelerated tilting of the crawler unit 2 upon crossing from a slope to level ground are of similar design. Said means comprise a supporting rail 45 which is mounted on the crawler unit 2 for pivoting movement about a horizontal transverse pivot 47 behind the overall centre of gravity of crawler unit 2, adapter 3, wheelchair 1 and wheelchair used such that upon crossing the edge 42 leading from a slope to level ground said supporting rail may be swung downwards beyond the plane defined by the lower track strands while engaging the level ground. In this case also there are preferably provided two mutually parallel supporting rails 45 disposed or mounted in spaced relationship intermediate the two tracks 16. The pivot 47 also is secured to both guide rails 12. Finally, the free end of the supporting rails 45 is likewise bent upwardly like the blade tip of a ski. In this respect the supporting rails 44 and 45 are similar as regards their shape and their mounting on the crawler unit.

The front and rear supporting rails 44, 45 are interconnected by way of a linkage 48, 51, 53 for jointly controlling the pivoting movement, a shock absorber 50 in the form of a gas pressure shock absorber being connected to said linkage. More in detail, the mentioned linkage comprises a double lever 48 pivotable about a horizontal pivot 49 and having respective links 51 and 53 pivotally mounted on the free ends thereof, the former one being connected to the front supporting rails 44 and the latter one being connected to the rear supporting rails 45 by means of joints 46 and 47, respectively. Pivoting of the links 51 and 53 to the front and rear supporting rails 44, 45 is respectively effected above the pivots 52, 54 on the crawler unit 2 and the ground-side guide rails 12, respectively. In this way it is ensured that the front and rear supporting rails 44, 45 are jointly swung out of the plane defined by the bottom strands of the tracks and swung back into said plane, respectively. In the illustrated embodiments, the mentioned shock absorber 50 engages the double lever 48 in the vicinity of the link 51 in such a way that in the retracted or swung-back state of the supporting rails 44, 45 (illustrated in FIGS. 6 and 8) only a slight "opening pressure" is applied thereto. This "opening pressure" increases the further the supporting rails 44, 45 are swung downwards, and thus the damping effect due to the supporting rails 44, 45 increases correspondingly. Preferably, the bottom of the supporting rails 44, 45 is polished. It is also possible to provide correspondingly configured continuous supporting belts or supporting rollers instead of the supporting rails 44, 45.

The mentioned damping of the tilting operation may also be achieved by the measure of providing in the vicinity of the horizontal pivot 49 associated with the double lever 48 a free-wheel or centrifugal brake whereby swinging back of the supporting rails 44, 45 is decelerated under load.

Preferably, the supporting rails 44, 45 can be locked mechanically, electromechanically or electromagnetically in the retracted or swung-back position.

It is further conceivable that the power supply to the drive motor of the crawler unit 2 is interrupted as soon as the supporting rails 44, 45 are swung down. In this way it is ensured that the crawler unit 2 will not drive too fast across the mentioned edge 42. Further travel can only be resumed when the tilting operation has been completed and the supporting rails 44, 45 have been retracted again.

Similarly, the power supply to the drive motor could also be interrupted in the embodiment illustrated in FIG. 5. In this case the bent rail portion 43 would have to cooperate with an appropriate pressure sensor or the like.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A crawler unit for coupling to a wheelchair and having a pair of power-driven tracks to be fitted between main wheels of the wheelchair, comprising:
    a frame mounting said power-driven tracks;
    an adapter for securing the wheelchair relative to said frame, said adapted including a coupling member for slidably mating with a complimentary coupling member on a wheelchair;
    means mounting said adapter to said frame and permitting relative movement between said adapter and said frame;
    lifting means connected to said frame and said adapter, and
    actuating means connected to said lifting means for selective operation of said lifting means by an occupant of a wheelchair secured by said adapter to permit said occupant to selectively lift the wheelchair and adapter relative to said frame and to lift the frame and power-driven tracks relative to the wheelchair and adapter.

2. The crawler unit defined by claim 1 wherein said adapter includes a supporting frame for securing a wheelchair in a rearwardly tilted position and said actuating means is operative to lift the adapter and tilted wheelchair to a travelling position wherein the wheelchair wheels are lifted off the ground and the power-driven tracks move the wheelchair.

3. The crawler unit defined by claim 1 wherein said actuating means comprise manual operating levers movably mounted to said adapter within reach of an occupant of a wheelchair secured by said adapter.

4. The crawler unit defined by claim 3 wherein said operating levers are telescopically extensible.

5. The crawler unit defined by claim 1 or 3, wherein said lifting means is a lever gear mounted by said actuating means in one direction to lift the wheelchair and adapter relative to said frame and movable by said actuating means in another direction to lift the frame and power-driven tracks relative to the wheelchair and adapter and further including a locking mechanism for fixing said lever gear in either one of said lifting positions.

6. The crawler unit defined by any one of claims 1 or 3, wherein the adapter coupling member is a male coupling member in the form of a spigot mounted at one end to the adapter and tapering toward its other end and said complimentary coupling member is a receptacle mounted beneath a wheelchair seat to slidably receive said spigot as said wheelchair moves toward said adapter, an abutment terminating sliding movement of said spigot relative to said receptacle, a stop member mounted on said wheelchair, said spigot being supported for pivoting movement about a transverse axis which defines a tilting axis of the wheelchair and a guideway secured to said adapter and extending in a circular arc concentric with said pivot axis, whereby said stop member is located between said guideway and said tilting axis when said abutment terminates sliding movement of said spigot and said guideway prevents said stop member from moving away from said adapter after said wheelchair is tilted about said tilting axis thereby preventing disengagement of said spigot from said receptacle and securing said wheelchair to the adapter.

7. The crawler unit as defined by claim 1 or 3, wherein one of said frame and said adapter mounts a supporting roller movable by an actuator into ground contact beneath a tilted backrest of said wheelchair.

8. The crawler unit as defined by claim 7, wherein the supporting roller is mounted to be pivotable about a vertical axis.

9. The crawler unit as defined by claim 7 wherein the actuator for the supporting roller is drivingly connected to a wheelchair position detector so that said actuator extends the supporting roller when the wheelchair is tilted and when the crawler unit is lifted with the wheelchair in the tilted position, and the supporting roller is retracted when the wheelchair is in its normal travelling position.

10. The crawler unit as defined by claim 9, wherein the actuator for the supporting roller is drivingly connected to the spigot.

11. The crawler unit as defined by claim 1 or 3 wherein the adapter includes at least one substantially horizontal holding bar which projects sideways beyond a seat area of the wheelchair when in its normal travelling position.

12. The crawler unit as defined by claim 1 or claim 3 wherein the adapter includes a stationary inclined supporting frame for supporting the wheelchair in a rearwardly tilted position and said supporting frame includes automatically latching safety clamps for engagement with the wheelchair to secure the wheelchair to the supporting frame.

13. The crawler unit as claimed in any one of the claims 1 or 3 wherein the crawler unit has concavely shaped guide rails for the ground engaging track sections.

14. The crawler unit as claimed in any one of claims 1 or 3, wherein the power-driven tracks of the crawler unit are divided lengthwise into two or more separately driven groups of tracks which are interconnected for articulated movement about a transverse axis.

15. The crawler unit as claimed in any one of claims 1 or 3, wherein the guide rails for the ground-engaging track strands are bent in a direction toward the upper strand of the tracks in the vicinity of a centre of gravity resulting from the combination of a crawler unit, adapter, wheelchair and wheelchair occupant.

16. The crawler unit as claimed in claim 15, and further including a pair of track guiding rollers which ensure horizontal guiding of each of the upper track strands and means urging said guiding rollers under resilient bias against the upper strands of said tracks to permit displacement of said ground engaging track strands into said bent guide rails.

17. The crawler unit as claimed in any one of claims 1 or 3, wherein the front area of the crawler unit includes means providing for decelerated tilting of the crawler unit upon crossing of an edge leading from level ground to a slope.

18. The crawler unit as claimed in claim 17, wherein the means providing for decelerated tilting of the crawler unit comprises a front supporting rails mounted on the crawler unit for pivoting movement about a horizontal pivot which extends transversely to a longitudinal direction of the crawler unit and said supporting rails is biased to be swung downward beyond a plane defined by the lower track strands when the crawler unit crosses an edge separating level ground from a slope.

19. The crawler unit as claimed in claim 18, wherein the supporting rail is coupled with a damping element.

20. The crawler unit as defined by claim 19 wherein said damping element is a gas pressure shock absorber.

21. The crawler unit as defined by claim 18 wherein the front supporting rail is coupled to a rear supporting rail pivotally mounted to the crawler unit behind the overall centre of gravity and said rear supporting rail dampens tilting movement of the crawler unit upon crossing an edge leading from a slope to level ground.

22. The crawler unit as claimed in claim 21, wherein the front and rear supporting rails are interconnected by means of a linkage for commonly controlling pivoting movement of said front and rear supporting rails and a damping element is connected to said common linkage.

23. The crawler unit as claimed in claim 22, wherein the damping element increasingly prestresses the front and rear supporting rails in accordance with and in the direction of increased swing-out movement of the supporting rails.

* * * * *